United States Patent
Sarikaya et al.

(10) Patent No.: US 8,539,053 B2
(45) Date of Patent: Sep. 17, 2013

(54) APPARATUS AND METHOD FOR DYNAMIC HOST CONFIGURATION PROTOCOL VERSION 6 EXTENSIONS FOR CONFIGURING HOSTS WITH MULTIPLE INTERFACES

(75) Inventors: Behcet Sarikaya, Wylie, TX (US); Yangsong Xia, Richardson, TX (US)

(73) Assignee: Futurewei Technologies, Inc., Plano, TX (US)

(*) Notice: Subject to any disclaimer, the term of this patent is extended or adjusted under 35 U.S.C. 154(b) by 698 days.

(21) Appl. No.: 12/711,624

(22) Filed: Feb. 24, 2010

(65) Prior Publication Data

US 2010/0223363 A1  Sep. 2, 2010

Related U.S. Application Data

(60) Provisional application No. 61/156,208, filed on Feb. 27, 2009.

(51) Int. Cl.
*G06F 15/16* (2006.01)

(52) U.S. Cl.
USPC .......................... 709/221; 709/228; 709/234

(58) Field of Classification Search
USPC ............... 709/220, 221, 227, 228, 234, 245
See application file for complete search history.

(56) References Cited

U.S. PATENT DOCUMENTS

| | | | |
|---|---|---|---|
| 2006/0015595 A1* | 1/2006 | Shantala et al. | 709/222 |
| 2008/0195761 A1* | 8/2008 | Jabri et al. | 709/250 |
| 2008/0200168 A1* | 8/2008 | Jiang | 455/432.1 |
| 2010/0215019 A1* | 8/2010 | Velev et al. | 370/331 |
| 2010/0265859 A1* | 10/2010 | Inoue et al. | 370/310 |
| 2011/0202970 A1* | 8/2011 | Kato et al. | 726/1 |

FOREIGN PATENT DOCUMENTS

| | | |
|---|---|---|
| CN | 1458760 A | 11/2003 |
| JP | 2008546321 A | 12/2008 |
| WO | 9826530 | 6/1998 |
| WO | 03103210 A2 | 12/2003 |
| WO | 2006130807 A2 | 12/2006 |

OTHER PUBLICATIONS

Savolainen, T., "DNS Server Selection on Multi-Homed Hosts," Internet Engineering Task Force, Internet Draft, draft-savolainen-mif-dns-server-selection-00, Feb. 19, 2009, 13 pages.

(Continued)

*Primary Examiner* — Douglas Blair
(74) *Attorney, Agent, or Firm* — Conley Rose, P.C.; Grant Rodolph; Brandt Howell (57) ABSTRACT

An apparatus comprising a plurality of communication interfaces configured to receive a dynamic host configuration protocol (DHCP) reply message comprising routing information for at least one of the plurality of interfaces, and a processor configured to select one of the plurality of interfaces for transmission based upon the routing information. An apparatus comprising at least one processor configured to implement a method comprising receiving a DHCP request message comprising a first multi-homed routing policy entry (MHRPE) option, selecting default route information based upon the first MHRPE option, and transmitting a DHCP reply message comprising a second MHRPE option comprising the default route information. A method comprising receiving a DHCP request message comprising a first MHRPE option, selecting default route information based upon the first MHRPE option, and transmitting a DHCP reply message comprising a second MHRPE option comprising the default route information.

19 Claims, 8 Drawing Sheets

(56) References Cited

OTHER PUBLICATIONS

Savolainen, T., "DNS Server Selection on Multi-Homed Hosts," Internet Engineering Task Force, Internet Draft, draft-savolainen-mif-dns-server-selection-01, Oct. 20, 2009, 13 pages.
Singh, H., et al., "Basic Requirements for IPv6 Customer Edge Routers," Internet Engineering Task Force, Internet Draft, draft-ietf-v6ops-ipv6-cpe-router-04, Jan. 24, 2010, 16 pages.
Singh, H., et al., "IPv6 CPE Router Recommendations," Network Working Group, Internet Draft, draft-wbeebee-ipv6-cpe-router-03, Oct. 30, 2008, 23 pages.
Jiang, S., et al., "Secure DHCPv6 Using CGAs," Network Working Group, Internet Draft, draft-jiang-dhc-secure-dhcpb6-01.txt, Jan. 8, 2009, 15 pages.
Jiang, S., et al., "Secure DHCPv6 Using CGAs," Network Working Group, Internet Draft, draft-jiang-dhc-secure-dhcpb6-03.txt, Feburary 5, 2010, 30 pages.
Lemon, T., et al., "The Classless Static Route Option for Dynamic Host Configuration Protocol (DHCP) Version 4," Network Working Group, RFC 3442, Dec. 2002, 10 pages.
Venaas, S., et al., "Information Refresh Time Option for Dynamic Host Configuration Protocol for IPv6 (DHCPv6)," Network Working Group, RFC 4242, Nov. 2005, 9 pages.
Narten, T., et al., "Neighbor Discovery for IP version 6 (IPv6)," Network Working Group, RFC 4861, Sep. 2007 98 pages.
Foreign Communication From a Related Counterpart Application, Korean Application No. 10-2011-7021531, Korean Office Action dated Jan. 9, 2013, 5 pages.
Foreign Communication From a Related Counterpart Application, Korean Application No. 10-2011-7021531, Translation of Korean Office Action dated Jan. 9, 2013, 3 pages.
Foreign Communication From a Related Counterpart Application, Japanese Application No. 2011-551401, Japanese Office Action dated Jan. 29, 2013, 3 pages.
Foreign Communication From a Related Counterpart Application, Japanese Application No. 2011-551401, Translation of Japanese Office Action dated Jan. 29, 2013, 3 pages.
Dec, et al. "DHCPv6 Route Option," draft-dec-dhcpv6-route-option-00.txt, Feb. 16, 2009, 8 pages.
Sarikaya, B., et al., "DCPv6 Extension for Configuring Hosts with Multiple Interfaces," draft-sarikaya-mif-dhcpv6solution-03.txt, Feb. 8, 2010.
Bradner, S., "Key Words for Use in RFCs to Indicate Requirement Levels," BCP 14, RFC 2119, Mar. 1997.
Rose, M., "Writing I-Ds and RFCs Using XML," RFC 2629, Jun. 1999.
Droms, R., et al., "Dynamic Hosts Configuration Protocol for IPv6 (DHCPv6)," RFC 3315, Jul. 2003.
Blanchet, M., "Multiple Interfaces Problem Statement," draft-ietf-mif-problem-statement-01.txt, Oct. 2009.
Yang, P., et al, "Requirements on Multiple Interface (MIF) of Simple IP," draft-yang-mif-req-00, Mar. 2009.
Soliman, H., et al., "Flow Bindings in Mobile IPv6 and NEMO Basic Support," draft-ietf-mext-flow-binding-04.txt, Nov. 9, 2009.
Tsirtsis, G., et al, "Traffic Selectors for Flow Bindings," draft-ietf-mext-binary-ts-02.txt, Dec. 2009.
Troan, O., et al, "IPv6 Prefix Options for Dynamic Host Configuration Protocol (DHCP) version 6," RFC 3633, Dec. 2003.
Draves, R., et al., "Default Router Preferences and More Specific Routes," RFC 4191, Nov. 2005.
Draves, R., "Default Address Selection for Internet Protocol version 6 (IPv6)," RFC 3484, Feb. 2003.
Narten, T., et al, "Neighbor Discovery for IP Version 6 (IPv6)," RFC 2461, Dec. 1998.
Gundavelli, S., et al., "Proxy Mobile IPv6," RFC 5213, Aug. 2008.
"Architecture Enhancements for Non-3GPP Accesses," 3GPP TS 23.402, Jun. 2009.
Sarikaya, B., et al., "DCPv6 Extension for Configuring Hosts with Multiple Interfaces," draft-sarikaya-mif-dhcpv6solution-02.txt, Sep. 8, 2009.
Sarikaya, B., et al., "DCPv6 Extension for Configuring Hosts with Multiple Interfaces," draft-sarikaya-mif-dhcpv6solution-00.txt Mar. 4, 2009.
Soliman, H., et al., "Flow Bindings in Mobile IPv6 and NEMO Basic Support," draft-ietf-mext-flow-binding-01.txt, Feb. 13, 2009.
Soliman, H., et al., "Flow Bindings in Mobile IPv6 and NEMO Basic Support," draft-ietf-mext-flow-binding-05.txt, Feb. 9, 2010.
Tsirtsis, G., et al, "Traffic Selectors for Flow Bindings," draft-ietf-mext-binary-ts-03.txt, Feb. 9, 2010.
Sarikaya, B., et al., "DCPv6 Extension for Configuring Hosts with Multiple Interfaces," draft-sarikaya-mif-dhcpv6solution-01.txt, Mar. 6, 2009.
Williams, C., "MIF Problem Requirements and Scenarios," draft-williams-mif-problem-scenarios-00.txt, Jul. 6, 2009.
Dec, W., et al., "DHCPv6 Route Option," draft-dec-dhcpv6-route-option-00.txt, Feb. 16, 2009, 8 pages.
Foreign Communication From a Related Counterpart Application, European Application No. 10745841.6, Extended European Search Report dated Aug. 9, 2011, 9 pages.
Foreign Communication From a Related Counterpart Application, PCT Application PCT/CN2010/070811, International Search Report dated Jun. 10, 2010, 5 pages.
Foreign Communication From a Related Counterpart Application, PCT Application PCT/CN2010/070811, Written Opinion dated Jun. 10, 2010, 8 pages.

\* cited by examiner

APPARATUS AND METHOD FOR DYNAMIC HOST CONFIGURATION PROTOCOL VERSION 6 EXTENSIONS FOR CONFIGURING HOSTS WITH MULTIPLE INTERFACES

CROSS-REFERENCE TO RELATED APPLICATIONS

The present application claims priority to U.S. Provisional Patent Application No. 61/156,208 filed Feb. 27, 2009 by Behcet Sarikaya et al. and entitled "DHCPv6 Extensions for Configuring Hosts with Multiple Interfaces," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WIFI) based on IEEE 802.11 standard, and Worldwide Interoperability for Microwave Access (WIMAX) based on IEEE 802.16 standard. Routers may periodically multicast a router advertisement message from their multicast ports announcing the IP address of the multicast port. A multi-homed host or node (e.g. a node with multiple interfaces) may wait for a router advertisement before connecting to a default gateway. Alternatively, the multi-homed host may multicast a router solicitation message requesting a router advertisement. The router may reply to a router solicitation with a router advertisement. After connecting to a network, a multi-homed host may broadcast a query to identify available Dynamic Host Configuration Protocol (DHCP) servers. The DHCP servers may advertise their availability in response to the request from the multi-homed host. The multi-homed host may then request specific information from one of the DHCP servers. The selected DHCP server may then provide the specific information to the multi-homed host.

SUMMARY

In an embodiment, the disclosure includes an apparatus comprising a plurality of communication interfaces configured to receive a DHCP reply message comprising routing information for at least one of the plurality of interfaces, and a processor configured to select one of the plurality of interfaces for transmission based upon the routing information.

In another embodiment, the disclosure includes an apparatus comprising at least one processor configured to implement a method comprising receiving a DHCP request message comprising a first multi-homed routing policy entry (MHRPE) option, selecting default route information based upon the first MHRPE option, and transmitting a DHCP reply message comprising a second MHRPE option comprising the default route information.

In yet another embodiment, the disclosure includes a method comprising receiving a dynamic host configuration protocol (DHCP) request message from a multi-homed host, wherein the DHCP request message comprises a first MHRPE option comprising an indication of a quantity of interfaces on the multi-homed host, and transmitting a DHCP reply message comprising a second MHRPE option comprising the default route information, wherein the multi-homed host selects a default route information based upon the second MHRPE option.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for configuring hosts with multiple interfaces using DHCPv6 extensions. A multi-homed host with multiple interfaces may communicate substantially simultaneously using more than one of the interfaces. Each interface may use a different default route and/or default router. Thus, it is necessary to configure each interface. In an embodiment, default routes, routers, and interfaces may be stored in a routing and policy table (defined in Internet Engineering Task Force (IETF) request for comments (RFC) 3484, which is incorporated herein by reference) on the multi-homed host. Configuration of the multi-homed host's routing/policy table may be accomplished using a DHCP message. The routing/policy table may comprise a prefix, a prefix length, a preference value, a lifetime, and an address of the next hop router for each of the default routers in the routing/policy table. The routing/policy table may contain additional information as required by the multi-homed host for data transmission. Configuring the routing/policy table via a DHCP message may increase network efficiency because the multi-homed host may already have to contact the DHCP server for an IP address lease. The routing information may be contained in a MHRPE option within a DHCP message. Assigning a single default router to a multi-homed host may cause a bottleneck of data at the assigned default router. By assigning multiple default routers based upon the interface and flow type, data may be more evenly distributed across multiple routers.

Figure 1:
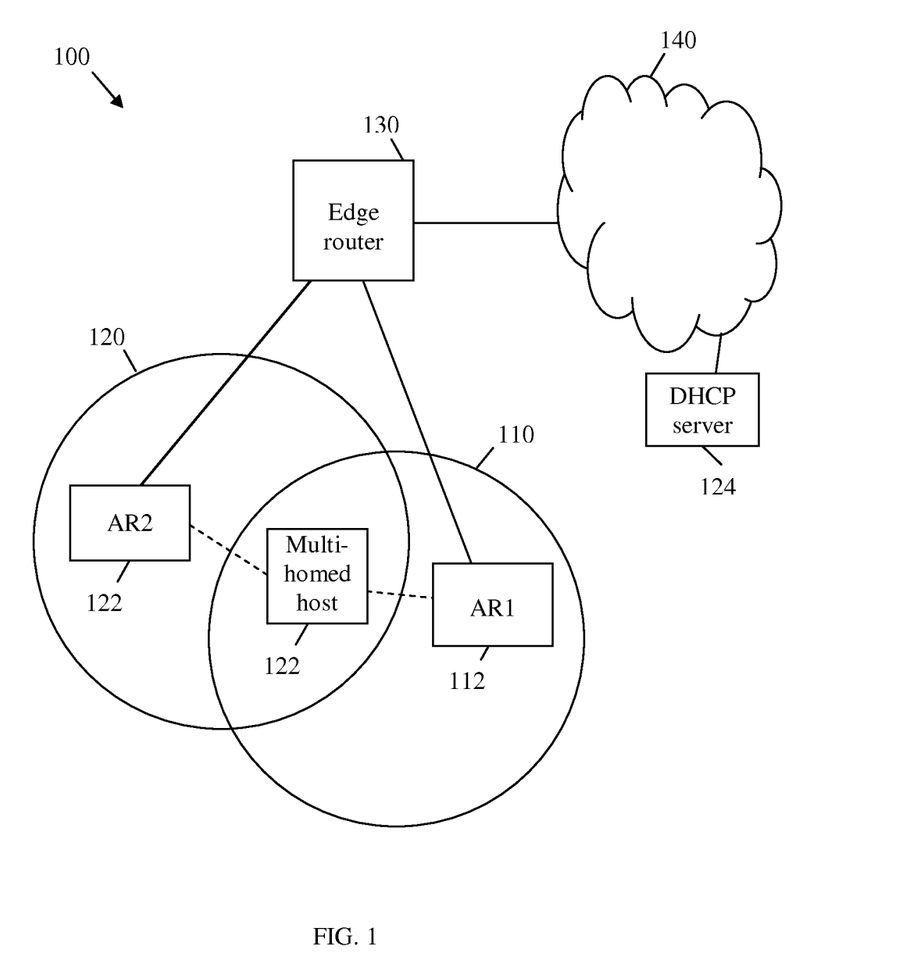
FIG. 1 is a schematic diagram of one embodiment of a wireless access network system.

FIG. 1 illustrates an embodiment of a wireless access network system 100, which may support configuring hosts with multiple interfaces using DHCPv6. The wireless access network system 100 may comprise a multi-homed host 102, a first access router (AR) 112 (AR1) in a first wireless access network 110, a second AR 122 (AR2) in a second wireless access network 120, a DHCP server 124, a edge router 130, and a network 140. The first wireless network 110 and the second wireless network 120 may independently establish connections and communicate with the network 140 directly or via the edge router 130. For example, the first wireless access network 110 may be a long term evolution (LTE) third Generation Partnership Project (3GPP) network and the second wireless network 120 may be an IEEE 802.11 Wireless Local Area Network (WLAN), also referred to as WIFI network. The multi-homed host 102 may be located in the first wireless network 110 and/or the second wireless network 120, e.g. within the coverage range of the network(s), and thus may communicate with the DHCP server 124 via the network 140. It will be appreciated that FIG. 1 illustrates only one embodiment of the wireless access network system 100. In alternative embodiments, the multi-homed host 102 may be located in any of a plurality of different wireless networks, e.g. WIMAX, high speed packet access interface (HSPA), LTE, and/or BLUETOOTH networks. Each network may comprise a corresponding AR and/or DHCP server, which may be coupled to the edge router 130 and/or network 140. The multi-homed host 102 may access any of the wireless networks to communicate with the network 140 or other networks (not shown).

The multi-homed host 102 may be any mobile device that uses the first AR 112, the second AR 122, the edge router 130, and/or the network 140 to access the DHCP server 124. The multi-homed host 102 may be a relatively simple IP access node having a plurality of communication interfaces, but no mobility capability (e.g. no mobility software, firmware, etc.). Specifically, the multi-homed host 102 may be a mobile user-oriented device that communicates with the DHCP server 124, e.g. via the first wireless access network 110 and/or the second wireless access network 120. For example, the multi-homed host 102 may be a cellular telephone, a notebook computer, a personal digital assistant (PDA), or any other wireless device. Alternatively, the multi-homed host 102 may be a fixed communications device, such as a desktop computer or set top box, which may be connected to the first AR 112, the second AR 122, and/or the edge router 130 using wireless technology.

The first AR 112 and the second AR 122 may be any devices or components configured to handle flows for the multi-homed host 102, e.g. based on IPv6 protocol. The flows may be IPv6 flows, sent to any wireless access network where the multi-homed host 102 may establish an active interface. The flows may correspond to services provided to the multi-homed host 102 by the network 140 and/or other external networks. For instance, the first AR 112 and/or the second AR 122 may handle a flow between the multi-homed host 102 and the network 140. The multi-homed host 102 may select between the first AR 112 and the second AR 122 for flow handling based upon a default routing/policy table on the multi-homed host 102. In a specific embodiment, the DHCP server 124 may send a message to the multi-homed host 102 with router information for the routing/policy table on the multi-homed host 102. In an embodiment, the first AR 112 and/or the second AR 122 do not support mobile internet protocol (MIP) or proxy mobile IP (PMIP).

The edge router 130 may be any device or component that provides connectivity and/or external access to the multi-homed host 102 via the first wireless network 110 and/or the second wireless network 120. The edge router 130 may be configured to support IPv6 protocol. The edge router 130 may also forward one or more flows to the multi-homed host 102 via any of the first AR 112 and the second AR 122 that may have an active interface with the multi-homed host 102. In an embodiment, the edge router 130 does not support mobile internet protocol (MIP) or proxy mobile IP (PMIP).

The network 140 may be any network that provides services to the multi-homed host 102 via the first wireless access network 110 and/or the second wireless access network 120. For instance, the network 140 may be an Internet Service Provider (ISP), a network service provider (NSP), an application service provider (ASP), or combinations thereof. The services may be provided to the multi-homed host 102 in the form of flows, such as IPv6 flows. The flows may comprise data, text, voice, video, and/or any other services. The flows may be received from the edge router 130, AR1 112, AR2 122, and/or the network 140 via various interfaces on the multi-homed host 102.

The DHCP server 124 may be any device or component configured to provide interface configuration information to the multi-homed host 102. The DHCP server 124 may be co-located with another server, such as the Access Network Discovery and Selection Function defined in 3GPP document 23.402 (which is incorporated herein by reference), or may be a stand alone server. The DHCP server 124 may be configured to communicate using standards established in IETF RFC 2131 for IPv4 and RFC 3315 for IPv6, which are incorporated by reference herein. The DHCP server 124 may be configured to assign IP addresses and other configuration data to clients attaching to a network, e.g. first wireless access network 110 and second wireless access network 120.

In an embodiment, the multi-homed host 102 may access the first wireless access network 110, which may be a LTE network, and establish a first interface with the first wireless access network 110. The multi-homed host 102 may contact the DHCP server 124 and send a DHCP request message comprising a MHRPE option. The DHCP server 124 may respond with a DHCP acknowledgment message comprising a MHRPE option. The MHRPE option in the DHCP acknowledgment may comprise default routes based upon flow types and/or interfaces on the multi-homed host 102. The flow types may correspond to a plurality of services available via the edge router 130. The services may comprise a voice over IP (VoIP) call, an IP television (IPTV) program, a file or point-to-point (p2p) download, or combinations thereof. Subsequently, the multi-homed host 102 may select an interface to receive the flow based upon the flow type and the entries in the multi-homed host 102 routing table. As such, the multi-homed host 102 may receive at least some of the services via the first wireless access network 110.

In some cases, it may be desirable for the multi-homed host 102 to establish a second interface with the second wireless access network 120 to receive at least some of the services. For example, the IPTV program and/or the file download may be received via the second wireless network 120 with improved bandwidth and/or reduced cost, in comparison to the first wireless access network 110. Thus, it may be desirable to receive some services via the first wireless network 110 and other services via the second wireless network 120. The multi-homed host 102 may connect to the second wireless access network 120 based upon the multi-homed host 102 routing table and the type of flow desired.

Figure 2:
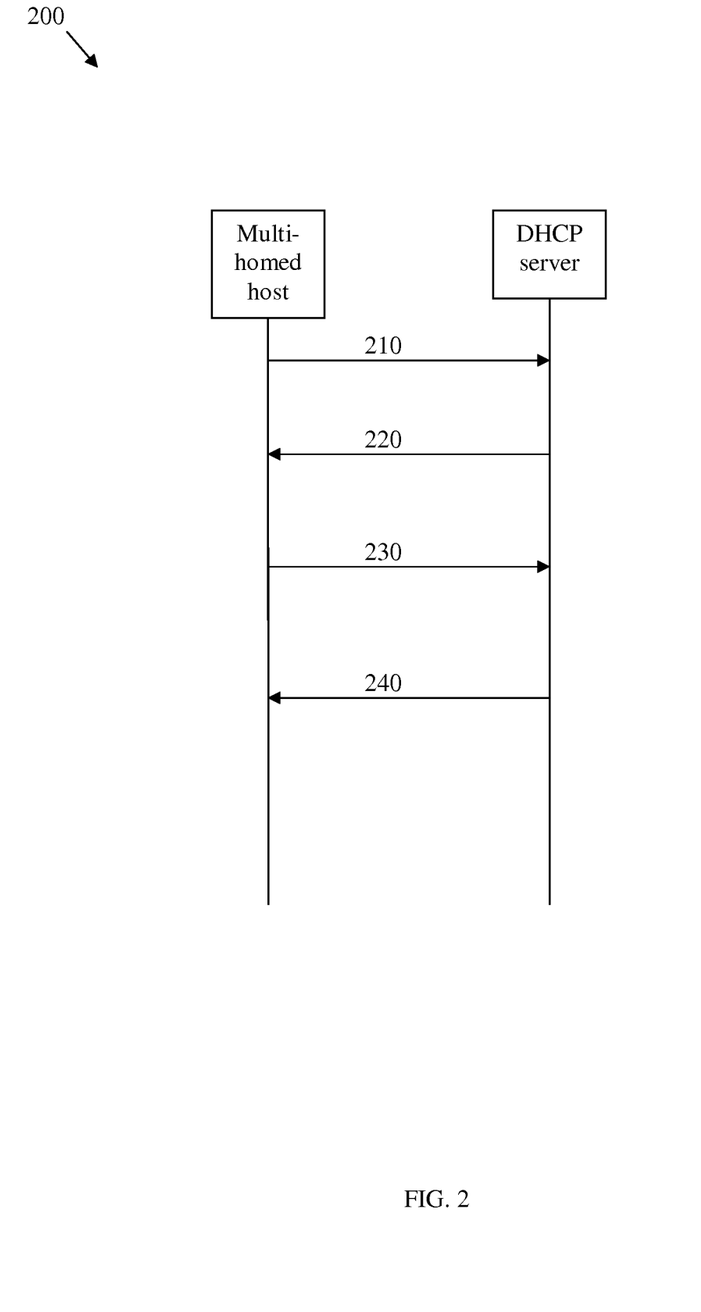
FIG. 2 is a protocol diagram of an embodiment of a host configuration method.

FIG. 2 illustrates one embodiment of a protocol diagram of a host configuration method 200, which may be used to identify default routes for a multi-homed host upon connection to a wireless access network. A multi-homed host may broadcast a DHCP solicit message 210 on the wireless access network as described in IETF RFC 3315. Responsive to receiving the DHCP solicit message 210, a DHCP server may respond with a DHCP advertise message 220. One or more DHCP servers may receive the DHCP solicit message 210 and may respond to the multi-homed host with a DHCP advertise message 220. The multi-homed host may select one of the DHCP servers to which to send a DHCP request message 230 based upon DHCP advertise messages 220 received by the multi-homed host. The multi-homed host may select only one DHCP server to receive the DHCP request message 230. The DHCP request message 230 may contain an MHRPE option, which is described in detail below. The MHRPE option may comprise sub-options, e.g. an interface information sub-option. The interface information sub-option may contain information regarding each of the interfaces available in the multi-homed host, e.g. WIFI, HSPA, LTE, WIMAX and/or BLUETOOTH. Responsive to receiving the DHCP request message 230, the DHCP server may transmit a DHCP reply message 240. The DHCP reply message 240 may comprise a MHRPE option, which may comprise sub-options. The sub-options may describe default routers for specific flow types. The multi-homed host may update its routing/policy table based upon the sub-options in the MHRPE option of the DHCP acknowledgment, and proceed with normal communications. In addition, IETF RFC 4191 (which is incorporated herein by reference) discloses router advertisements, but is limited to only setting route information and does not disclose many of the features described herein. In an embodiment, RFC 4191-based configuration using router advertisements can be used in conjunction with the concepts described herein.

Figure 3:
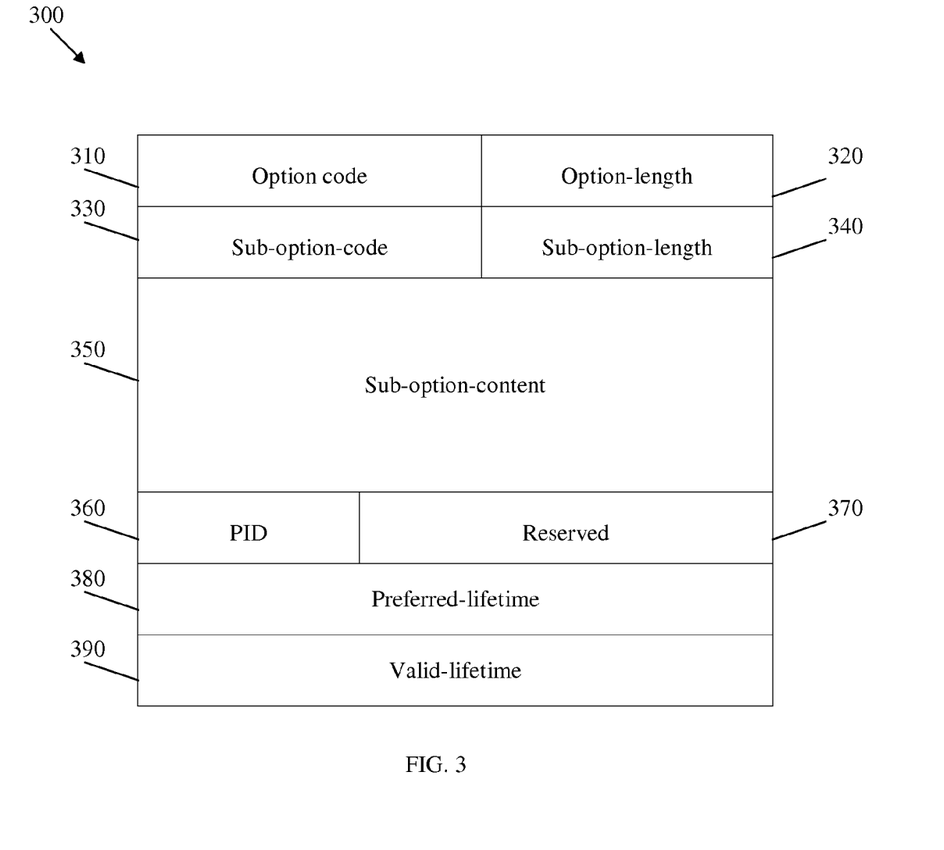
FIG. 3 is a schematic diagram of an embodiment of a MHRPE option.

FIG. 3 is a schematic diagram of an embodiment of a MHRPE option 300. The MHRPE option 300 may contain an option-code 310, an option length 320, a sub-option code 330, a sub-option length 340, sub-option content 350, a policy identifier (PID) 360, a reserved field 370, a preferred lifetime 380, and a valid lifetime 390, which may be arranged as shown in FIG. 3. The option code 310 may be an alphanumeric code, such as OPTION_MHRPE, assigned by the internet assigned numbers authority (IANA) that may uniquely identify the MHRPE option 300. The option length 320 may indicate the sum of the lengths of all the sub-options plus four octets. The sub-option code 330 may be a code to identify a particular sub-option used within the sub-option content 350. Sub-option codes 330 are described in greater detail below. The value of the sub-option codes 330 may be assigned by IANA. The sub-option length 340 may indicate the total length of the particular sub-option. The sub-option content 350 may comprise any of the sub-options described below, or any other known sub-options. The PID 360 may be an unsigned integer used as the identifier for the policy in the MHRPE option 300. The reserved field 370 may be reserved for other purposes and may be set to zero by the sender and ignored by the receiver. The preferred lifetime 380 may be a desired lifetime of the MHRPE options defined in seconds, and may be set by the multi-homed host. The valid-lifetime 390 may be the actual lifetime assigned to the MHRPE options defined in seconds, and may be set by the DHCP server. The DHCP server may consider the preferred lifetime 380 when setting the valid lifetime 390. In an embodiment, the option code 310, option length 320, sub-option code 330, and sub-option length 340 may each be about 16 bits in length, the sub-option content 350 length may vary, the PID 360 may be about 8 bits in length, the reserved field 370 may be about 24 bits in length, and the preferred lifetime 380 and valid lifetime 390 may each be about 32 bits in length.

In an embodiment, the MHRPE option 300 may be contained in a DHCPv6 request message sent by a multi-homed host. The multi-homed host may include information about each of its interfaces in the sub-option content 350. The DHCP server may include an MHRPE option 300 in a DHCPv6 reply message. The MHRPE option 300 in the DHCPv6 reply message may include sub-options with information about flow descriptions, QoS, flow route prefixes, and IPv6 router addresses corresponding to the interfaces on the multi-homed host defined in the DHCPv6 request message sent by the multi-homed host. The multi-homed host may update its routing/policy table based upon the DHCP Reply message MHRPE option 300.

In another embodiment, the multi-homed host (e.g. the DHCP client) may include the MHRPE option 300 in an Option Request Option (defined in IETF RFC 3315, which is incorporated herein by reference) in the DHCPv6 request message. In such a case, the DHCP Server may include the MHRPE option 300 and the routing information in another Option Request Option in the corresponding DHCPv6 reply message. The Option Request Option comprising the MHRPE option 300 may also be included in the DHCP solicit and the DHCP advertise messages. In addition, the option may contain a list of routing policies, each of which may contain the flow description and the route to apply when the datagram to forward is matching.

Figure 4:
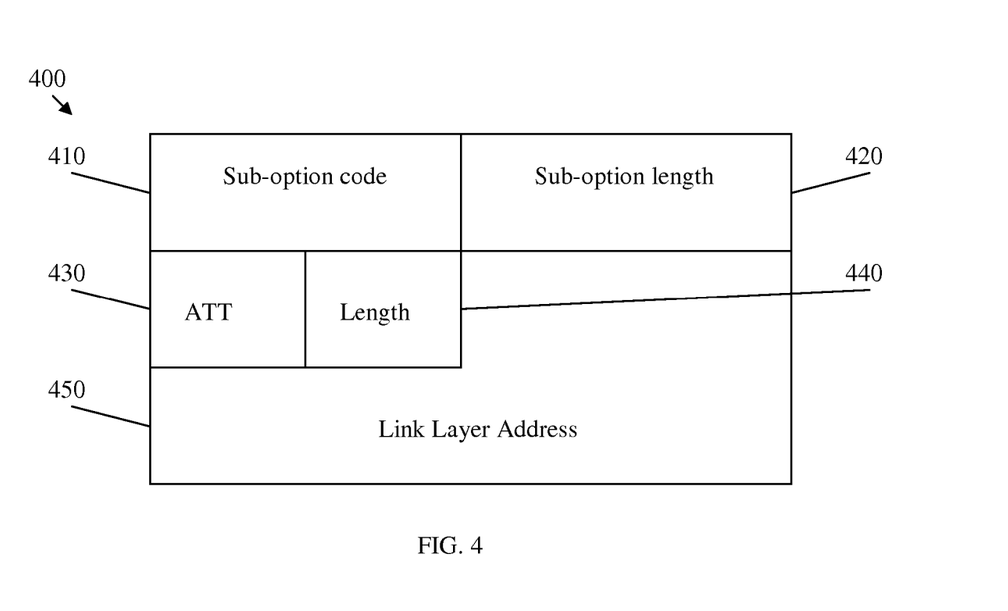
FIG. 4 is a schematic diagram of an embodiment of an interface information sub-option.

FIG. 4 is a schematic diagram of an embodiment of an interface information sub-option 400. The interface information sub-option 400 may comprise a sub-option code 410, a sub-option length 420, an access technology type (ATT) 430, a length 440, and a link layer address 450, which may be arranged as shown in FIG. 4. The sub-option code 410 may be an alphanumeric code, such as SUB_OPTION_INTERFACE_INFO, assigned by IANA that may uniquely identify the interface information sub-option 400. The sub-option code 410 may correspond to the sub-option code 330. The sub-option length 420 may indicate the length of the interface information sub-option 400. The sub-option length 420 may correspond to the sub-option length 340. The ATT 430 may specify the access technology used by the interface, e.g. WIFI, HSPA, LTE, WIMAX, or BLUETOOTH. The values of the ATT 430 may be selected from the access technology option type values defined by IANA and described in IETF RFC 5213, which is incorporated by reference herein. The length 440 may indicate the length in bytes of the link layer address 450. The link layer address 450 may be the MAC address of the interface for IEEE interfaces, for example Ethernet or Wi-Fi, an International Mobile Subscriber Identity (IMSI) for a third generation (3G) interface, or some other identifier based upon the interface. In an embodiment, the sub-option code 410 and sub-option length 420 may each be about 16 bits in length, the ATT 430 and length 440 may each be about 8 bits in length, and the link layer address 450 may be about 80 bits in length or may vary in length.

Figure 5:
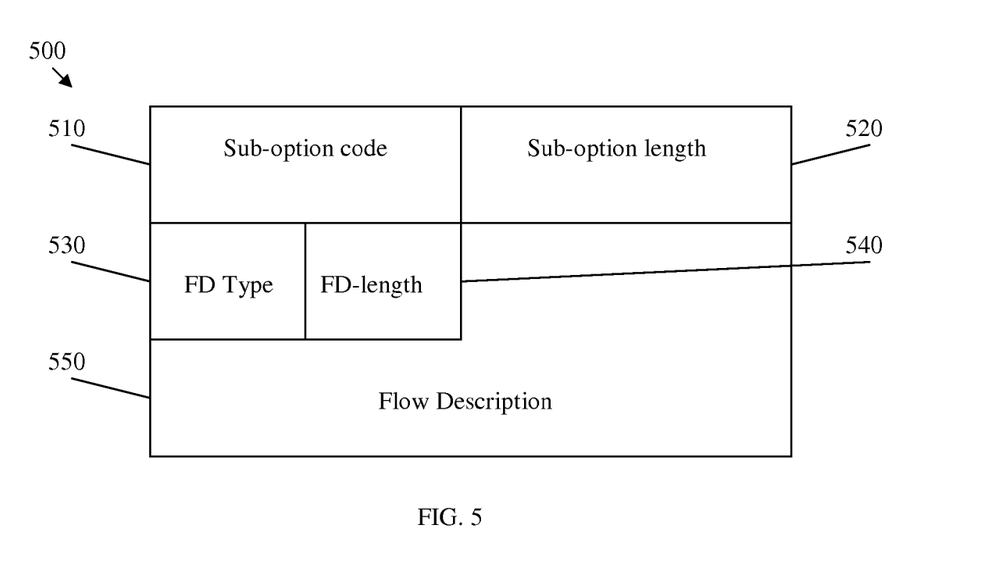
FIG. 5 is a schematic diagram of an embodiment of a flow description sub-option.

FIG. 5 is a schematic diagram of an embodiment of a flow description sub-option 500. The flow description sub-option 500 may comprise a sub-option code 510, a sub-option length 520, a flow description (FD) type 530, a FD length 540, and a flow description 550, which may be arranged as shown in FIG. 5. The sub-option code 510 may be an alphanumeric code, such as SUB_OPTION_FLOW_DESC, assigned by IANA that may uniquely identify the flow description sub-option 500. The sub-option code 510 may correspond to the sub-option code 330. The sub-option length 520 may indicate the length of the flow description sub-option 500. The sub-option length 520 may correspond to the sub-option length 340. The FD type 530 may describe the type of flow description. For example, a FD-type 530 of 1 (one) may indicate a binary flow description, and a FD Type 530 of 2 (two) may indicate a text flow description. FD-Type of 0 (zero) may be reserved for future use. The FD length 540 may indicate the length of the flow description 550 in bytes. The flow description 550 may contain a description of a flow. The flow description 550 may be in binary or text depending upon the value of the FD type 530. Binary flow descriptions may be found in IETF document draft-ietf-mext-binary-ts, which is incorporated by reference herein. The length of flow description 550 may be about equal to the value of FD length 540. More than one flow description may be included in MHRPE option 300. The preferred interface for the flow described in flow description sub-option 500 may be described in interface information sub-option 400. In an embodiment, the sub-option code 510 and sub-option length 520 may each be about 16 bits, the FD type 530 and FD length 540 may each be about 8 bits in length, and the flow description 550 length may vary.

Figure 6:
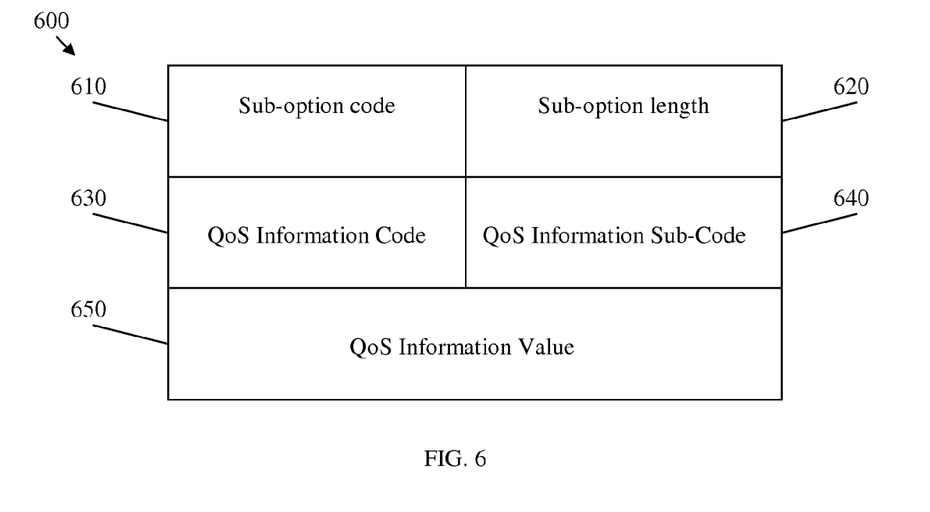
FIG. 6 is a schematic diagram of an embodiment of a Quality of Service (QoS) information sub-option.

FIG. 6 is a schematic diagram of an embodiment of a QoS information sub-option 600, which may be arranged as shown in FIG. 6. The QoS sub-option 600 may comprise a sub-option code 610, a sub-option length 620, a QoS information code 630, a QoS information sub-code 640, and a QoS information value 650. The sub-option code 610 may be an alphanumeric code, such as SUB_OPTION_QOS_INFO, assigned by IANA that may uniquely identify the QoS information sub-option 600. The sub-option code 610 may correspond to the sub-option code 330. The sub-option length 620 may indicate the length of the QoS information sub-option 600. The sub-option length 620 may correspond to the sub-option length 340. The QoS information code 630 may identify the type of the QoS information. For example, a QoS information code 630 of 1 (one) may indicate a packet rate, a QoS information code 630 of 2 (two) may indicate a one-way delay metric, and a QoS information code 630 of 3 (three) may indicate an inter-packet delay variation. A QoS information code 630 of 0 (zero) may be reserved for future use.

The QoS information sub-code 640 may identify the sub-type of the QoS information. For example, a QoS information sub-code 640 of 1 (one) may indicate a reserved rate, a QoS information sub-code 640 of 2 (two) may indicate an available rate, a QoS information sub-code 640 of 3 (three) may indicate a loss rate, a QoS information sub-code 640 of 4 (four) may indicate a minimum one-way delay, a QoS information sub-code 640 of 5 (five) may indicate a maximum one-way delay rate, and a QoS information sub-code 640 of 6 (six) may indicate an average one-way delay. A QoS information sub-code 640 of 0 (zero) may indicate that there is no sub-type defined. The QoS information value 650 may indicate the value of the QoS information, e.g. 150 kilobits per second (kbps) or 400 kbps. The units of the QoS information value 650 may depend upon the value of the QoS information code 630. The QoS information may be selected based upon the flow type and/or the interface type, e.g. 150 kbps for video streaming on a LTE interface, and 400 kbps for video streaming on a Wi-Fi interface. In an embodiment, the sub-option code 610, the sub-option length 620, the QoS information code 630, and the QoS information sub-code 640 may each be about 16 bits in length, and the QoS information value 650 may be about 64 bits in length.

Figure 7:
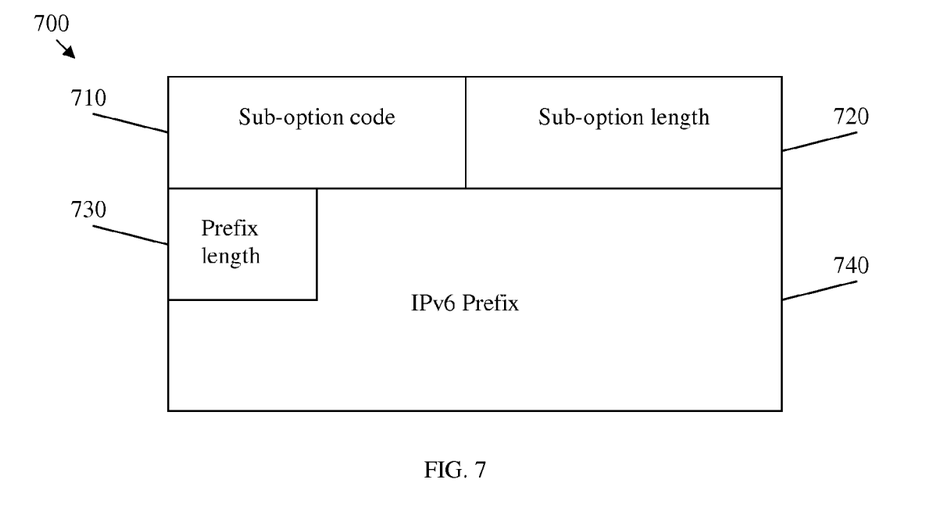
FIG. 7 is a schematic diagram of an embodiment of a flow route prefix sub-option.

FIG. 7 is a schematic diagram of an embodiment of a flow route prefix sub-option 700. The flow route prefix sub-option 700 may comprise a sub-option code 710, a sub-option length 720, a prefix length 730, and an IPv6 prefix 740, which may be arranged as shown in FIG. 7. The sub-option code 710 may be an alphanumeric code, such as SUB_OPTION_FR_PREFIX, assigned by IANA that may uniquely identify the flow route prefix sub-option 700. The sub-option code 710 may correspond to the sub-option code 330. The sub-option length 720 may indicate the length of the flow route prefix sub-option 700. The sub-option length 720 may correspond to the sub-option length 340. The prefix length 730 may describe the length of the IPv6 prefix 740. The IPv6 prefix 740 may identify the destination prefix of the route over which the flow described in flow description sub-option 500 will be routed. The IPv6 prefix 740 may not exceed the length identified in the prefix length 730. In an embodiment, the sub-option code 710 and the sub-option length 720 may each be about 16 bits in length, the prefix length 730 may be about 8 bits in length, and the IPv6 prefix 740 may have a variable length.

Figure 8:
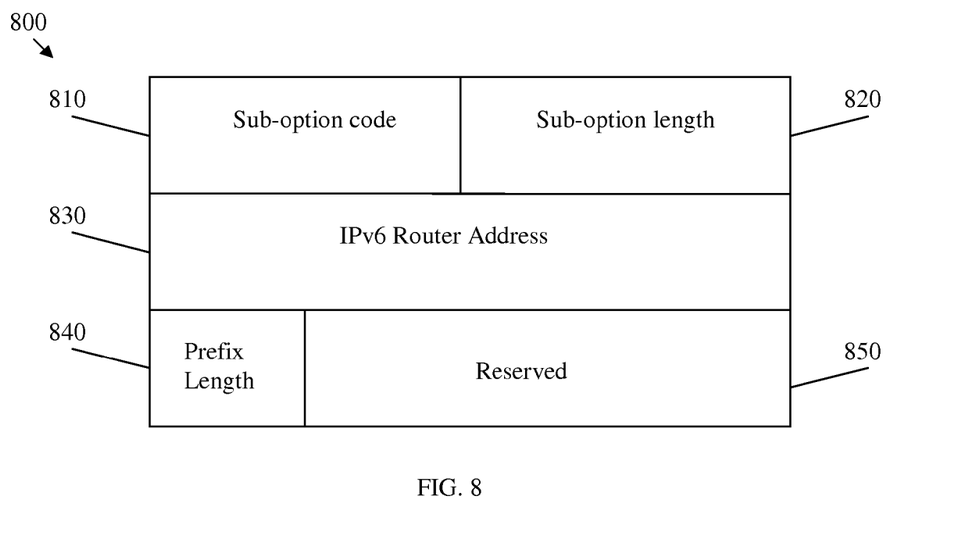
FIG. 8 is a schematic diagram of an embodiment of a router address sub-option.

FIG. 8 is a schematic diagram of an embodiment of a router address sub-option 800. The router address sub-option 800 may comprise a sub-option code 810, a sub-option length 820, an IPv6 router address 830, a prefix length 840, and a reserved field 850, which may be arranged as shown in FIG. 8. The sub-option code 810 may be an alphanumeric code, such as SUB_OPTION_ROUTER_ADDRESS, assigned by IANA that may uniquely identify the router address sub-option 800. The sub-option code 810 may correspond to the sub-option code 330. The sub-option length 820 may indicate the length of the router address sub-option 800. The sub-option length 820 may correspond to the sub-option length 340. The IPv6 router address 830 may identify the default router address for a route. The prefix length 840 may identify the length of the prefix of the IPv6 router address field. The reserved field 850 may be reserved for other purposes and may be set to zeros by the sender and ignored by the receiver. In an embodiment, the sub-option code 810 and sub-option length 820 may each be about 16 bits in length, the IPv6 router address 830 may be about 128 bits in length, the prefix length 840 may be about 8 bits in length, and the reserved field 850 may be about 24 bits in length. A MHRPE option 300 may comprise a plurality of router address sub-options 800. The first router address sub-option 800 listed in the MHRPE option 300 may be identified as the primary router for the route. The combination of the flow route prefix sub-option 700 and the router address sub-option 800 may identify a route.

Figure 9:
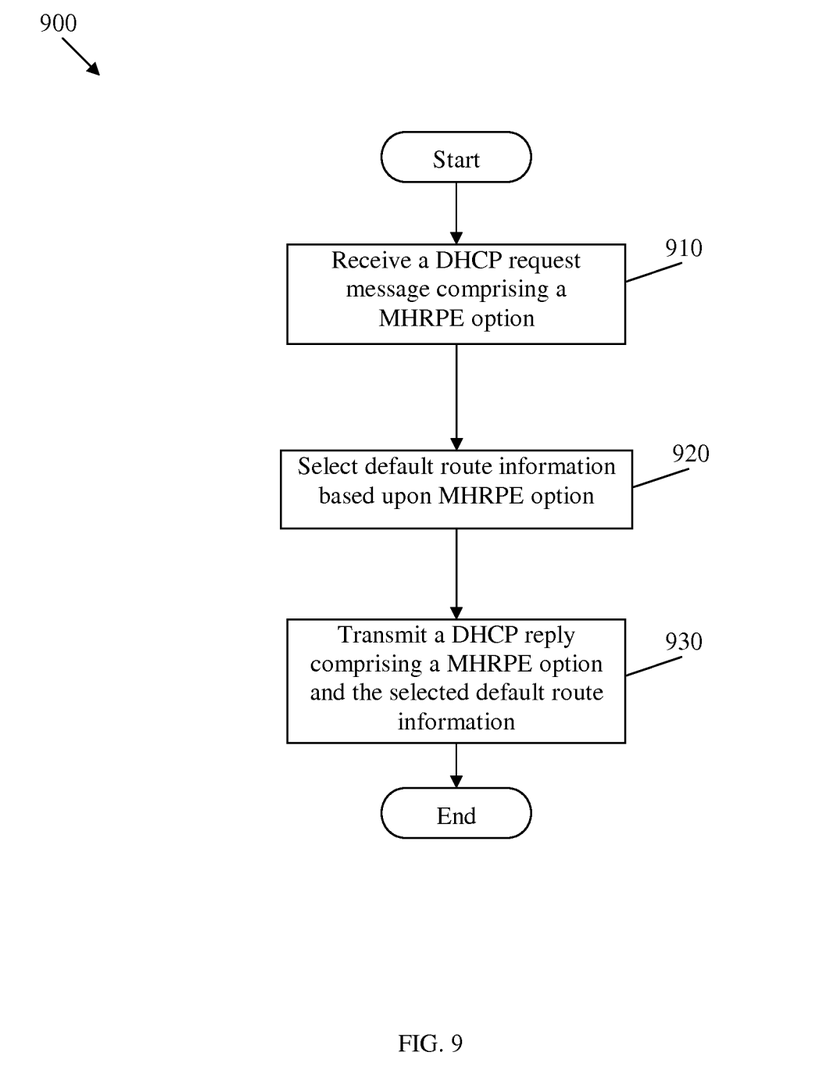
FIG. 9 is a flow chart of an embodiment of a method for configuring hosts with multiple interfaces.

FIG. 9 is a schematic diagram of an embodiment of a method 900 for configuring hosts with multiple interfaces. The method 900 may be implemented at a DHCP server. The method 900 may begin at block 910 by receiving a DHCP request message comprising an MHRPE option. The DHCP request message may be sent by a multi-homed host or other device upon joining a network. The multi-homed host or other device may include interface information sub-options in the MHRPE option describing each of the interfaces available on the multi-homed host or other device. At block 920, the default route information may be selected based upon the interfaces described in the MHRPE option. At block 930, a DHCP reply message comprising a MHRPE option may be sent to the multi-homed host. The MHRPE option in the DHCP reply message may comprise a plurality of sub-options for use in defining default routes for flows and interfaces at the multi-homed host or other device.

Figure 10:
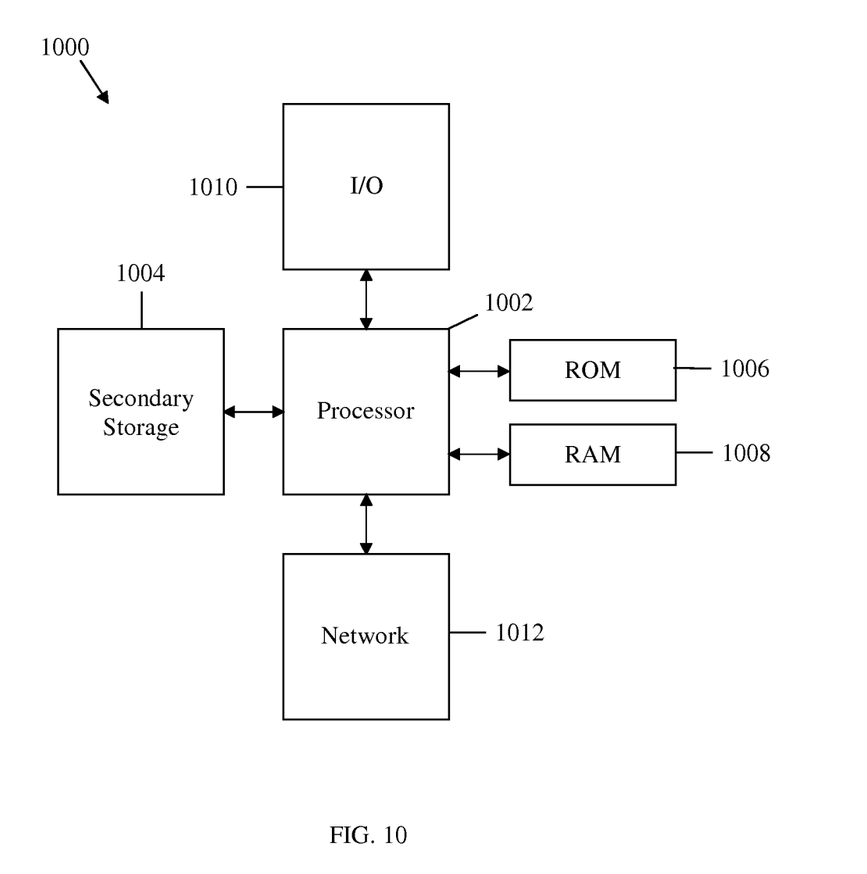
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
at least one processor configured to:
receive a dynamic host configuration protocol (DHCP) request message from a multi-homed host, wherein the DHCP request message comprises a first multi-homed routing policy entry (MHRPE) option that specifies characteristics of the multi-homed host;
select default route information corresponding to the characteristics specified in the first MHRPE option; and
transmit a DHCP reply message comprising a second MHRPE option comprising the default route information for updating a routing/policy table on the multi-homed host.

2. The apparatus of claim 1, wherein the first MHRPE option comprises a plurality of first sub-options and a preferred lifetime.

3. The apparatus of claim 2, wherein the first sub-options comprise an interface information sub-option for each interface on a mobile node, and wherein the interface information sub-option comprises a link layer address and an access technology type.

4. The apparatus of claim 2, wherein the second MHRPE option comprises a plurality of second sub-options and a valid lifetime.

5. The apparatus of claim 4, wherein the second sub-options comprise a flow description sub-option comprising a flow description type and a flow description.

6. The apparatus of claim 5, wherein the second sub-options further comprise a quality of service (QoS) sub-option corresponding to the flow description and one of the interfaces on the mobile node.

7. The apparatus of claim 5, wherein the second sub-options further comprise a flow route prefix sub-option comprising a interne protocol version 6 (IPv6) prefix corresponding to a flow description.

8. The apparatus of claim 5, wherein the second sub-options further comprise an IPv6 router address sub-option comprising a default router address corresponding to the flow description.

9. A method comprising:
receiving a dynamic host configuration protocol (DHCP) request message from a multi-homed host, wherein the DHCP request message comprises a first multi-homed routing policy entry (MHRPE) option comprising an indication of a quantity of interfaces and type of interfaces on the multi-homed host;
selecting default route information corresponding to interface information specified in the MHRPE option received from the multi-homed host; and
transmitting a DHCP reply message comprising a second MHRPE option comprising the default route information, wherein the multi-homed host selects a default route information for itself based upon the second MHRPE option received in the DHCP reply message.

10. The method of claim 9, wherein the second MHRPE option comprises a flow description sub-option that comprises a flow-type and a preferred interface.

11. The method of claim 10, wherein the second MHRPE option comprises a flow route prefix sub-option that corresponds to the flow description sub-option.

12. The method of claim 11, wherein the second MHRPE option comprises internet protocol version six (IPv6) router address sub-option that comprises a default router address.

13. The method of claim 12 further comprising identifying a route based upon the combination of the flow route prefix sub-option and the IPv6 router address sub-option.

14. The method of claim 9, wherein the DHCP request message comprises a first option request option comprising the first MHRPE option, and wherein the DHCP reply message comprises a second option request option comprising the second MHRPE option.

15. The method of claim 14 further comprising:
receiving a DHCP solicit message from the multi-homed host, wherein the DHCP request message comprises a third option request option comprising a third MHRPE option; and
transmitting a DHCP advertise message comprising a fourth option request option comprising a fourth MHRPE option.

16. An apparatus comprising:
a plurality of communication interfaces configured to:
transmit a dynamic host configuration protocol (DHCP) request message comprising information identifying the plurality of interfaces; and
receive a dynamic host configuration protocol (DHCP) reply message, in response to the DHCP request message, comprising routing information for the plurality of interfaces;
a memory store comprising a default routing/policy table; and
a processor configured to:
update the routing/policy table based upon the routing information; and
select one of the plurality of interfaces for transmission based upon the updated routing/policy table.

17. The apparatus of claim 16, wherein the plurality of interfaces comprises at least two of an Institute of Electrical and Electronics Engineers (IEEE) 802.11 interface, a high speed packet access (HSPA) interface, a long term evolution (LTE) interface, a worldwide interoperability for microwave access (WIMAX) interface, and a BLUETOOTH interface.

18. The apparatus of claim 16, wherein the DHCP reply message is received responsive to connecting to a network.

19. The apparatus of claim 18, wherein the network does not support mobile internet protocol (MIP) or proxy mobile IP (PMIP).

* * * * *

UNITED STATES PATENT AND TRADEMARK OFFICE
CERTIFICATE OF CORRECTION

PATENT NO. : 8,539,053 B2
APPLICATION NO. : 12/711624
DATED : September 17, 2013
INVENTOR(S) : Behcet Sarikaya and Yangsong Xia It is certified that error appears in the above-identified patent and that said Letters Patent is hereby corrected as shown below:

In the Claims

Column 11/Line 1 through Column 11/Line 4 - Claim 7 should read as follows:

7. The apparatus of claim 5, wherein the second sub-options further comprise a flow route prefix sub-option comprising a internet protocol version 6 (IPv6) prefix corresponding to a flow description.

Signed and Sealed this
Twenty-second Day of October, 2013

Teresa Stanek Rea
*Deputy Director of the United States Patent and Trademark Office*